(12) United States Patent
Hole et al.

(10) Patent No.: US 9,374,760 B2
(45) Date of Patent: *Jun. 21, 2016

(54) APPARATUS AND METHOD FOR PROCESSING PRIORITY INFORMATION IN A WIRELESS DEVICE

(71) Applicant: BlackBerry Limited, Waterloo (CA)

(72) Inventors: David Philip Hole, Southampton (GB); Andrew John Farnsworth, Kidderminster (GB); Raghavendra M. Rangaiah, Birmingham (IN)

(73) Assignee: BlackBerry Limited, Waterloo, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 14/599,193

(22) Filed: Jan. 16, 2015

(65) Prior Publication Data

US 2015/0133127 A1 May 14, 2015

Related U.S. Application Data

(63) Continuation of application No. 13/466,993, filed on May 8, 2012, now Pat. No. 8,971,892.

(51) Int. Cl.
*H04W 36/36* (2009.01)
*H04L 5/14* (2006.01)
(Continued)

(52) U.S. Cl.
CPC ............... *H04W 36/36* (2013.01); *H04L 5/14* (2013.01); *H04W 36/0061* (2013.01); *H04W 36/0072* (2013.01); *H04W 36/14* (2013.01); *H04W 88/06* (2013.01)

(58) Field of Classification Search
CPC ............ H04W 36/36; H04W 36/0061; H04W 36/0072; H04W 36/14; H04W 88/06; H04L 5/14
USPC .......................................... 455/437, 438, 436
See application file for complete search history.

(56) References Cited

U.S. PATENT DOCUMENTS

| 7,437,178 B2 | 10/2008 | Jeong et al. | |
| 8,971,892 B2 * | 3/2015 | Hole .................... | H04W 36/36 455/436 |

(Continued)

FOREIGN PATENT DOCUMENTS

| EP | 2262310 A1 | 12/2010 |
| WO | 2010092049 A1 | 8/2010 |

OTHER PUBLICATIONS

European Patent Office, Extended European Search Report on Application No. 13788019.1, Issued on Jun. 8, 2015.

(Continued)

*Primary Examiner* — Barry Taylor
(74) *Attorney, Agent, or Firm* — Moffat & Co.

(57) ABSTRACT

A user equipment capable of performing reselection in a wireless network is disclosed. The user equipment comprises: 1) a controller configured to perform reselection between cells according to a priority-based reselection (PBR) algorithm using priority information; 2) transceiver circuitry configured to operate in cells using at least one radio access technology and to receive incoming messages including the priority information; and 3) a memory configured to store the received priority information. The controller is further configured to compare the received priority information with defined limits stored in the memory and to determine if the received priority information exceeds the defined limits.

18 Claims, 5 Drawing Sheets

(51) Int. Cl.
*H04W 36/00* (2009.01)
*H04W 88/06* (2009.01)
*H04W 36/14* (2009.01)

(56) References Cited

U.S. PATENT DOCUMENTS

| | | |
|---|---|---|
| 2006/0264215 A1 | 11/2006 | Ekstedt et al. |
| 2010/0184429 A1 | 7/2010 | Tod et al. |
| 2010/0240367 A1 | 9/2010 | Lee et al. |
| 2011/0034169 A1 | 2/2011 | Roberts et al. |
| 2011/0250888 A1 | 10/2011 | Ryu et al. |
| 2013/0053035 A1 | 2/2013 | Johansson et al. |
| 2013/0065593 A1 | 3/2013 | Roberts et al. |
| 2013/0084850 A1 | 4/2013 | Martin et al. |

OTHER PUBLICATIONS

Research in Motion UK LTD, "Priority based reselection: clarifications and corrections", 3GPP Draft; GP-111494, Sep. 2, 2011.
QUALCOMM, "Number of UTRAN and inter-RAT frequencies", 3GPP Draft; R2-020517, Feb. 21, 2002.
3RD Generation Partnership Project, 3GPP Standard; 3GPP TS 36.331, No. V10.5.0, Mar. 13, 2012.
Nokia Corporation et al, "Introduction of 1-15 absolute priorities reselection", 3GPP Draft; R2-084691, Sep. 1, 2008.
Research in Motion UK Limited, "Dedicated Priority Information: Signalling and storage limits", 3GPP Draft; R2-122612, May 14, 2012.
PCT International Search Report in PCT Application No. PCT/IB2013/001280 dated Dec. 3, 2013.

* cited by examiner

| Current RAT | E-UTRAN | UTRAN | GSM |
|---|---|---|---|
| Messages Used For Dedicated Priorities | RRC Connection Release | UTRAN MOBILITY INFO | CHANNEL REL., PACKET MEAS. ORDER, PACKET CELL CHANGE ORDER |
| Limit on GSM Priorities | Up to 16 x <PRIORITY, ARFCN0, BAND_IND, one of <up to 32xARFCN> or <N_ARFCN(max 32), DELTA_ARFCN> or <Up to 129 of ARFCNs in range ARFCN0, . . ., ARFCN0+128 inclusive> > | N_GSM x <PRIORITY, ARFCN0, BAND_IND, one of <up to 32xARFCN> or <N_ARFCN (max 32) , DELTA_ARFCN> or <up to 129 of the ARFCNs in range ARFCN0, . . . , ARFCN0+128 inclusive> or <up to 1024 ARFCNs starting at ARFCN0 and ending at endingARFCN, and wrapping from 1023 to 0 if necessary> > | Single priority applicable to all GSM freq. |
| Limit on UTRAN Priorities | Up to 16 x <PRIORITY, UARFCN> for FDD; Plus up to 16 x <PRIORITY, UARFCN> for TDD | N_UTRAN_FDD x <PRIORITY, up to 8xUARFCN> + N_UTRAN_TDD x <PRIORITY, up to 8xUARFCN > | Unlimited frequencies with arbitrary priorities |
| Limit on E-UTRAN Priorities | Up to 8 x <PRIORITY, EARFCN> | N_EUTRAN x <PRIORITY, up to 8xEARFCN> | Unlimited frequencies with arbitrary priorities |
| Overall Limit | N/A | N_GSM +N_UTRAN_TDD +N_UTRAN_FDD +N_EUTRAN <= 8 | N/A |

FIGURE 4

| Current RAT | Proposed Limit For Storage |
|---|---|
| Limit on GSM Priorities | Up to<br>3 x <PRIORITY, ARFCN0, BAND_IND, one of <up to 32xARFCN> or <N_ARFCN(max 32), DELTA_ARFCN> or <Up to 129 of ARFCNs in range ARFCN0, . . ., ARFCN0+128 inclusive>or <up to 1024 ARFCNs starting at ARFCN0 and ending at endingARFCN, and wrapping from 1023 to 0 if necessary>><br><br>or<br><br>Single priority allocable to all GSM frequencies |
| Limit on UTRAN Priorities | Up to<br>16 x < PRIORITY, UARFCN > for FDD;<br><br>plus up to<br>16 x < PRIORITY, UARFCN > for TDD |
| Limit on E-UTRAN Priorities | Up to 8 x <PRIORITY, EARFCN> |
| Overall Limit | No Additional Limit |

FIGURE 5

APPARATUS AND METHOD FOR PROCESSING PRIORITY INFORMATION IN A WIRELESS DEVICE

TECHNICAL FIELD

The present application relates generally to wireless devices and, more specifically, to handling priority information in a mobile terminal.

BACKGROUND

Conventional wireless networks support priority-based reselection (PBR) operations, in which a user equipment (or mobile device) accessing a first cell re-selects to a second cell. A priority-based reselection operation uses priority information in its algorithm to choose the second cell. The priority information may be common priority information that is common to multiple user equipment or may be dedicated priority information that is device-specific to a particular user equipment.

In a priority-based reselection algorithm, an initial ranking of neighbouring cells may be done based on assigned priorities rather than on relative or absolute radio measurement. It is possible to assign device-specific priority information, which persists across multiple cells, including cells of different radio access technologies (RATs). Reselection algorithms are typically based on measured properties of a signal associated with a particular cell. For example, for a GSM cell, measurements of the signal transmitted on the broadcast control channel (BCCH) frequency for that cell may be used for a PBR algorithm.

In earlier reselection algorithms, a wireless device often made such measurements for multiple (possibly all) candidate cells. This often required measurements and comparisons of values for cells using different radio access technologies. As the numbers and types of cells increase (e.g., introduction of new RATs), such a re-selection algorithm becomes progressively more complex. First, there are more candidate neighbour cells to evaluate. Second, it becomes harder to define appropriate ways of comparing measurements of cells, which operate using different radio access technologies.

BRIEF DESCRIPTION OF THE DRAWINGS

For a more complete understanding of the present disclosure and its advantages, reference is now made to the following description taken in conjunction with the accompanying drawings, in which like reference numerals represent like parts:

FIG. 4 illustrates a table that lists the constraints and formats for sending conventional dedicated priority information in the various RAT networks; and FIG. 5 illustrates a table that comprises limits on priority information that may be transmitted in different types of RAT networks according to the principles of the present disclosure.

DETAILED DESCRIPTION

Figure 1:
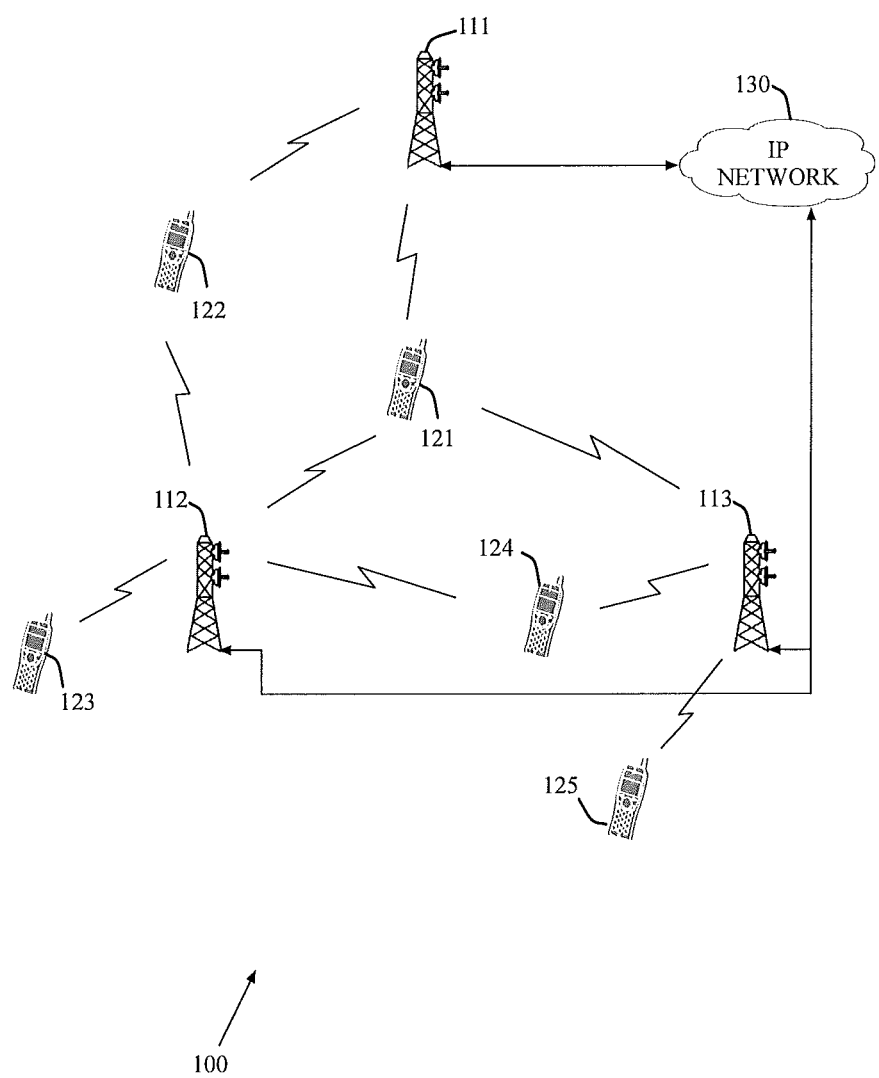
FIG. 1 illustrates an exemplary wireless network according to one aspect of the disclosure.

FIGS. 1 through 5, discussed herein, and the various aspects thereof used to describe the principles of the present disclosure are by way of illustration only and should not be construed in any way to limit the scope of the disclosure. Those skilled in the art will understand that the principles of the present disclosure may be implemented in any suitably arranged wireless user equipment.

In 3GPP Release 8, which coincided with the first specifications of the Evolved UMTS Terrestrial Radio Access Network (E-UTRAN), a new priority-based reselection algorithm was defined based on priority levels. In a PBR algorithm, cells are grouped into different priority layers. For any given neighbour cell, a determination is made as to whether it fulfills certain reselection requirements. If it meets the requirements, then no further evaluation of cells with lower priorities is necessary. Comparison of multiple cells is only necessary if multiple cells within a priority level meet the criteria. In the 3GPP priority-based reselection algorithm, it is not permitted to have cells using different RATs have the same priority level. This means there is no requirement to compare measurements of cells of different RATs when using the reselection algorithm. Examples of different radio access technologies (RATs) are Global System for Mobile Communications (GSM), UTRAN and E-UTRAN.

Two sets of thresholds for candidate neighbour cells are specified. The set of thresholds to be used depends on whether the neighbour cell has a higher or lower priority than the serving cell. For candidate neighbour cells with a higher priority than the serving cell, the reselection criteria do not include any criteria associated with the serving cell. Reselection to a candidate neighbour cell with a lower priority than the serving cell is possible only if the serving cell measurements meet some criteria—typically that the strength and/or quality of the serving cell signal has dropped below some threshold(s).

Cells which support PBR broadcast the applicable thresholds for neighbour cells and common priorities. These common priorities are used if the device has no stored dedicated priority information. Dedicated priority information (or "individual priorities") may be transmitted using point-to-point signaling to individual mobile devices to set the priorities that a particular mobile device should use. The manner in which dedicated priorities are set is a matter of network operator policy and not within the scope of the standards. However, as an example, a user equipment (UE) device associated with a high-value subscription may be assigned dedicated priorities that permit access to high-bandwidth cells (e.g., LTE cells) and that determine that these cells are considered as a high priority in the reselection algorithm. A device with a low-value subscription may be assigned a lower (or no) priority for the same cells. To avoid ping ponging between different cells, dedicated priority information should be consistent, regardless of the RAT in which it was transmitted. Furthermore, when a device performs cell reselection from one cell to another, any stored dedicated priority information should remain valid, even if the cells use different RATs.

Dedicated priorities may contain priorities for frequencies that are not in the current neighbour cell list and are not available locally. This ensures that a mobile device that moves to a region where these frequencies are available will already have the correct and applicable priorities. Dedicated priority information may be associated with a validity timer—on the order of 5 to 180 minutes. At the expiry of this timer, which is also inherited at cell reselection across RATs as above, the dedicated priority information is deleted and the mobile device reverts to using common priority information. If no timer is specified, the dedicated priorities remain valid indefinitely (i.e., until deleted due to some other rule).

Dedicated priority information is provided in different messages, depending on the RAT of the current serving cell. In GSM, the Channel Release message, the Packet Measurement Order message, and the Packet Cell Change Order message may be used. In UTRAN, the UTRAN MOBILITY INFO message may be used. In E-UTRAN, the RRC Connection Release message may be used. Signaling is quite different from one RAT to another RAT and allows for different numbers and combinations of frequency and priority indications for cells of different RATs to be indicated.

The Table in FIG. 4 lists the constraints and formats for sending conventional dedicated priority information in the various RAT networks. Columns in the Table in FIG. 4 represent the RAT (e.g., GSM, UTRAN) in which the priority information is signaled. Rows in the Table in FIG. 4 correspond to the RAT for which priority information is being signaled. For example, the signaling in E-UTRAN permits priorities to be signaled for up to 16 UTRAN FDD frequencies and up to 16 UTRAN TDD frequencies (i.e., 3rd row, 2nd column). It is noted that the variables N_GSM, N_UTRAN_FDD, N_UTRAN_TDD, and N_EUTRAN are used only in the context of this disclosure document, and are not used in 3GPP specifications. It is further noted that in a GSM/EDGE radio access network (GERAN), only a single priority may be signaled for GSM cells. In UTRAN and E-UTRAN, it is possible to signal different priorities for different GSM cells.

In E-UTRAN and GSM specifications, the mobile device is simply required to store the information received in the respective message, with no further details given on the details of the storage format. However in 3GPP Technical Specification 25.331, a variable called the PRIORITY_INFO_LIST is defined for the purpose of storing priority information while in UTRAN.

In E-UTRAN systems, dedicated priority information may be deleted on state change. Different rules apply to UTRAN and GSM. Generally, in UTRAN and GSM RATs, priority information is not affected by transitions between different Radio Resource Control (RRC) and/or RR states. However, in a E-UTRAN RAT, dedicated priorities are deleted on entering RRC_CONNECTED mode. This difference may have been motivated by the fact that there is no cell reselection in EUTRA connected mode, while in the other RAT networks, cell reselection in (at least some) connected mode(s) is allowed (e.g., UMTS CELL_FACH, UMTS Cell_PCH, and UMTS URA_PCH states and in GERAN Packet Transfer mode). Also, deletion on handover is implicit from the absence of specification of inheritance of priority information at handover. See, for example, Section 5.2.4.1 of 3GPP Technical Specification 36.304.

Some general problems with the foregoing schemes are the diversity of the signaling options, the need for storage of dedicated priorities when moving across RATs, and the limitations of the PRIORITY_INFO_LIST variable. The capacity for GSM priority information within the PRIORITY_INFO_LIST may not be sufficient to store all possible GSM priority information that could be sent in the UTRAN priority information signaling. Also, it is not possible to represent the GSM option of "one priority for all GSM frequencies" using the PRIORITY_INFO_LIST. Thus, the signaling capabilities in GSM for UTRAN and E-UTRAN may exceed the storage capability of the PRIORITY_INFO_LIST variable.

In GSM, there are no explicit limits on the number of E-UTRAN and UTRAN frequencies for which priority information can be provided in the Individual Priority Information Element (IE). As noted, only one GSM priority can be provided, applicable to all GSM frequencies. This option cannot be stored in the PRIORITY_INFO_LIST variable. In UTRAN and E-UTRAN signaling, there are different limitations on the number of UTRAN and E-UTRAN frequencies for which priority information can be provided and multiple priorities can be signalled for different GSM frequencies. Moreover, the UTRAN variable PRIORITY_INFO_LIST is limited in the amount of priority information it can contain. There is the risk that individual priority information may be provided in GSM or E-UTRAN which exceeds the capacity of this structure. Furthermore, in UTRAN, it is possible to signal more GSM frequencies in the Dedicated Priority Info IE than can be stored in the PRIORITY_INFO_LIST.

This lack of harmonization across the radio access technologies (RATs) and lack of reasonable and consistent limits across RATs and within UTRAN may lead to inconsistent implementations, in particular relating to the case where priorities are expected to be inherited when the user equipment moves from one RAT to another. There is presently no information in 3GPP Technical Specification No. 25.331 on how to handle cases where priorities obtained in another RAT cannot be stored within the PRIORITY_INFO_LIST variable.

Further, no behaviour is specified regarding the handling of dedicated priority information during a handover procedure. Explicit specification text specifies the inheritance of priority information at cell change due to inter-RAT cell reselection or cell selection. It is implied that at inter-RAT handover dedicated priorities are discarded. A further problem relates to the specified behaviour in E-UTRAN, whereby at RRC connection establishment, the UE is required to delete dedicated priority information.

The above may lead to one or more of the following problem cases for the user equipment (UE):

Link failure in E-UTRAN—If a UE loses a connection in E-UTRAN without completing a normal RRC Connection release procedure, then the UE may end up in idle mode with no stored dedicated priorities. This may lead to the UE performing reselection based on the common priorities instead. This may lead to different behaviour compared with using the dedicated priorities that would have been provided in the RRC Connection Release message.

Link failure after handover (HO)—If, after inter-RAT handover (HO), the UE suffers link failure before dedicated priorities can be signaled in the new cell (regardless of the RAT of the new cell), then a similar issue arises.

Different behaviour depending on previous handover—Consider a first UE with stored dedicated priorities which moves from a UTRAN cell to a GSM cell and back again, and then terminates the connection. The UE may have no dedicated priorities stored due to the handover procedure. A second UE with stored dedicated priorities that remains in the same UTRAN cell and then terminates the connection will keep its stored dedicated priorities.

Requirement to send dedicated priorities prior to state change after HO—A corollary of the above issue is that the network may currently need to send dedicated priority information to each device that incurs an inter-RAT HO before moving the device to a state where autonomous reselection is permitted. In the case of a GSM/EDGE radio access network (GERAN) Packet-Switch (PS) handover, this may be required after every handover, if the network permits autonomous reselection while in packet transfer mode (i.e., the UE is in mode NC0 or NC1) in order to ensure the desired behaviour. Similar issues may arise in other RATs if autonomous reselection is possible in connected mode and/or immediately after handover. The new cell controller may not be able to determine whether an inbound handover is an inter-RAT handover or intra-RAT handover. The new cell controller may therefore have to treat some intra-RAT handovers as inter-RAT and provide dedicated priorities to all mobiles after such handovers.

Serving cell does not support PBR—If the cell that the UE ends up in after HO does not support PBR, then subsequent reselection follows legacy reselection rules (e.g. ranking-based reselection) until the UE moves to a cell which supports PBR and will then use common priorities, rather than dedicated priorities. This could happen even without any movement by the UE, such as when the UE is handed over from a PBR-capable UTRAN to a non-PBR capable GSM for load balancing of voice calls. When the call terminates, the UE may move according to legacy reselection back to UTRAN, where the UE then uses common priorities, since the UE may have no dedicated priorities The present disclosure describes apparatuses and methods that may place limits on the number of UTRAN and E-UTRAN dedicated priorities which a user equipment (UE) is required to be able to handle. These limits may be coordinated across different RATs, such that there is no possible ambiguity for UE behaviour when inheriting priorities during a change from one RAT to another, provided these limits are respected on the network side. The PRIORITY_INFO_LIST variable may be updated to satisfy the requirements. Similarly, for example for GSM signaling, minimum limits may be placed on the number of UTRAN and E-UTRAN dedicated priorities which the UE is required to be able to handle.

More specifically, the disclosed apparatuses and methods may place limits on the amount of priority information that the user equipment is expected to be able to process and store, and may define behaviour when priority information exceeding these limits (but which can, nevertheless, be signaled) is received. In an example, the proposed limits may be as shown in the right-hand column of the Table in FIG. 5. It is noted that it is possible to represent "all GSM frequencies" by two instances of the proposed GSM structure, where ARFCN0=0, endingARFCN=1023, and BAND_IND=0 and 1, respectively, in the two instances. The user equipment may treat any use of the ARFCN0+endingARFCN as "single priority applicable to all GSM frequencies". It is observed that ARFCN0+endingARFCN may not be able to cover all GSM frequencies with a single instance, due to the overlap of DCS and PCS AFRCN values. Nevertheless, a single instance using the endingARFCN may be considered to cover all GSM frequencies, including both DCS and PCS frequencies.

FIG. 1 illustrates exemplary wireless network 100 according to one aspect of the present disclosure. Wireless network 100 includes base station (BS) 111, BS 112, and BS 113. BS 111, BS 112 and BS 113 may communicate with each other via wireless links or by a wireline backbone network (e.g., optical fiber, DSL, cable, T1/E1 line, etc.). By way of example, in FIG. 1, each of base stations 111-113 is configured to communicate with other base stations using Internet protocol (IP) network 130, which may be, for example, the Internet, a proprietary IP network, or another data network. Each of base stations 111-113 is also configured to communicate with a conventional circuit-switched telephone network (not shown), either directly or by means of network 130.

BS 111 provides wireless broadband access to network 130 to a first plurality of user equipments (UEs) within a coverage area of BS111. The first plurality of UEs includes user equipment (UE) 121 and UE 122, among others. BS112 provides wireless broadband access to network 130 to a second plurality of UEs within a coverage area of base station 112. The second plurality of UEs includes UE 121, UE 122, UE 123, and UE 124, among others. BS113 provides wireless broadband access to network 130 to a third plurality of UEs within a coverage area of BS113. The third plurality of UEs includes UE 121, UE 124, and UE 125, among others. It is noted that UE 121 is able to access all three of base stations 111-113, whereas UE 125 is only able to access BS 113 and UE 123 is only able to access BS 112. UE 122 and UE 124 can each access two base stations.

Each of base stations 111-113 may provide different levels of service to UEs 121-125 according to priority levels (common and/or dedicated) associated with each UE. For example, BS 111 may provide a T1 level service to UE 121 and may provide a fractional T1 level service to UE 122. UEs 121-125 may use the broadband access to network 130 to access voice, data, video, video teleconferencing, and/or other broadband services. Each one of UEs 121-125 may be any of a number of types of wireless devices, including a wireless-enabled laptop computer, a personal data assistant, a notebook, a mobile phone, a tablet, or another wireless-enabled device.

It is noted that the term "base station" may be commonly used in some types of networks, such as CDMA2000 systems or some 3GPP systems. But "base station" is not universally used in all types of radio access technology (RAT). In some types of networks, the term "base station" may be replaced by "eNodeB", or "eNB", or "access point". For the purposes of simplicity and consistency, the term "base station" is used in this disclosure document, and in the claims in particular, to refer to the network infrastructure device that provides wireless access to user equipment.

Similarly, the term "user equipment" may be commonly used in some types of networks, but not in others. In some types of networks, the term "user equipment" may be replaced by "subscriber station", "mobile station", "remote terminal", "wireless terminal" or the like. For the purposes of simplicity and consistency, the term "user equipment", or "UE", is used in this disclosure document, and in the claims in particular, to refer to the remote wireless device that accesses the network infrastructure device (i.e., the base station).

Figure 2:
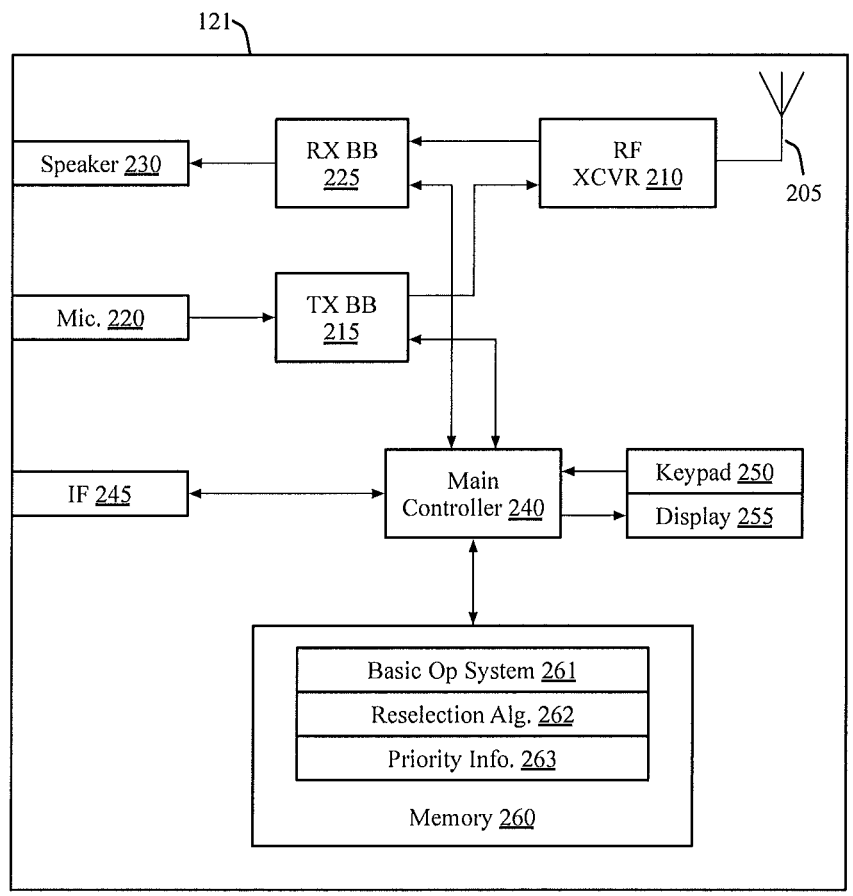
FIG. 2 illustrates user equipment according to one aspect of the disclosure.

FIG. 2 illustrates an example user equipment (UE) 121 according to the present disclosure. UE 121 comprises at least one antenna 205, radio frequency (RF) transceiver (XCVR) 210, transmitter baseband (TX BB) processing circuitry 215, microphone 220, and receiver baseband (RX BB) processing circuitry 225. UE 121 also comprises speaker 230, main controller 240, input/output (I/O) interface (IF) 245, keypad 250, display 255, and memory 260. Memory 260 stores basic operating system (OS) program 261, reselection algorithm 262, priority information 263, and other data (not shown).

Radio frequency transceiver 210 receives from antenna 205 an incoming RF signal transmitted by a base station of wireless network 100. Radio frequency transceiver 210 comprises receiver circuitry configured to operate in cells associated with one or more types of radio access technology (RAT) networks (e.g., GSM, UTRAN, E-UTRAN, etc.). Radio frequency transceiver 210 down-converts the incoming RF signal to produce an intermediate frequency (IF) or a baseband signal. The IF or baseband signal is sent to RX BB processing circuitry 225, which may produce a processed baseband signal by, for example, filtering and digitizing the received baseband or IF signal, additional filtering, and, if necessary, demodulation and/or decoding. Receiver baseband (RX BB) processing circuitry 225 transmits the processed baseband signal to speaker 230 (i.e., voice data) or to main controller 240 for further processing (e.g., web browsing).

Transmitter baseband (TX BB) processing circuitry 215 may receive analog or digital voice data from microphone 220 or other outgoing baseband data (e.g., web data, e-mail, interactive video game data) from main controller 240. TX BB processing circuitry 215 may encode, modulate, multiplex, and/or digitize the outgoing baseband data to produce a processed baseband or IF signal. Radio frequency transceiver 210 receives the outgoing processed baseband or IF signal from TX BB processing circuitry 215. Radio frequency transceiver 210 up-converts the baseband or IF signal to a radio frequency (RF) signal that is transmitted via antenna 205.

Main controller 240 may comprise any device, system or part thereof that controls at least one operation. Such a device may be implemented in hardware, firmware or software, or some combination of at least two of the same. Main controller 240 is a microprocessor or a microcontroller. Memory 260 is coupled to main controller 240. Part of memory 260 may comprise a random access memory (RAM) and another part of memory 260 may comprise a non-volatile memory, such as Flash memory.

Main controller 240 executes basic operating system (OS) program 261 stored in memory 260 in order to control the overall operation of UE121. In one such operation, main controller 240 controls the reception of forward channel signals and the transmission of reverse channel signals by radio frequency transceiver 210, RX BB processing circuitry 225, and TX BB processing circuitry 215, in accordance with well-known principles.

Main controller 240 is capable of executing other processes and programs resident in memory 260. Main controller 240 can move data into or out of memory 260, as required by an executing process. Main controller 240 is also coupled to I/O interface 245. I/O interface 245 provides UE 121 with the ability to connect to other devices, such as laptop computers and handheld computers. I/O interface 245 is the communication path between these accessories and main controller 240. Main controller 240 may also be coupled to an input device, such as keypad 250, and display 255. The operator of user equipment 121 uses keypad 250 to enter data into user equipment 121. Display 255 may be a liquid crystal display capable of rendering text and/or at least limited graphics from web sites. Alternate examples may use other types of displays (or none). Display 255 may include a touch screen input device which may be used in conjunction with, or in place of, keypad 250.

User equipment 121 is configured to store and to use priority information 263 in memory 260 according to the principles of the present disclosure. Main controller 240 executes reselection algorithm 262, which uses priority information 263, to improve operation of UE 121. For example, the reselection algorithm 262 may obviate one or more of the problems described above. Main controller 240, under control of reselection algorithm 262, may be configured to limit the amount of priority information that UE 121 is expected to take into account when performing PBR-based reselection. Main controller 240 may be further configured to define behaviour when priority information exceeding these limits is received from a base station. By way of example and not by limitation, main controller 240 may use the limits shown in the Table in FIG. 5 to limit the contents of priority information 263 in memory 260.

Figure 3:
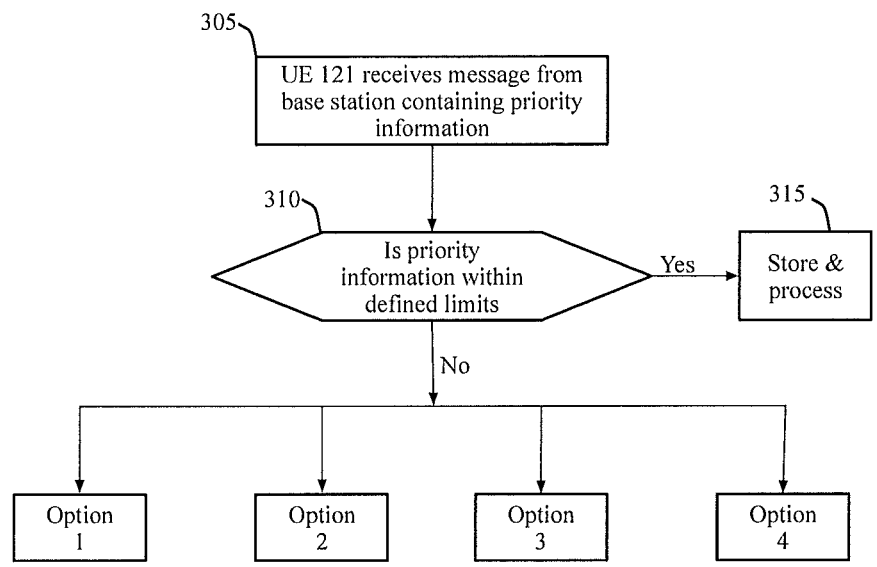
FIG. 3 illustrates the operation of an exemplary user equipment that receives priority information that exceeds defined limits according to one aspect of the disclosure.

FIG. 3 illustrates the operation of exemplary user equipment (UE) 121 when UE 121 receives priority information that exceeds defined limits according to one aspect of the disclosure. The scope of the defined limits on priority information is not restricted in this disclosure. By way of example, a defined limit may comprise a number of priority levels and/or carrier frequencies (or cells operating thereon) to which priorities are assigned. A limit also may comprise one or more RAT-specific limits (e.g., a limit on the number of carrier frequencies for which priorities are provided for cells operating on a particular RAT), and/or an overall limit covering priority information across all RATs. Where priority information is signaled or can be stored using a hierarchical approach (e.g., using RAT-specific structures to contain priority information applicable for that RAT, or using a structure to contain frequencies to which a given priority applies), the limit may comprise a number of instances of an entity type within the hierarchy (e.g., number of structures of a given type).

Initially, UE 121 receives an incoming message containing priority information (step 305). Main controller 240 in UE 121 may compare the priority information to existing limits, such as the limits in the Table in FIG. 5 (step 310). If the priority information is within limits (Yes in 310), then main controller 240 stores the limits in memory 260 for subsequent processing in a cell reselection operation (step 315). If the priority information exceeds the limits in the Table in FIG. 5 (No in 310), there may be a number of possibilities regarding how user equipment 121 and main controller 240 may respond. Immediately upon receipt of "not allowed" priorities, UE 121 may be configured to do one or more of Options 1-4, as described further below. Options 1, 2, and 4 are directed towards instances in which priority information is first received. Option 3 is directed more towards instances when a change of RAT occurs and inherited individual priority information is present.

In 3GPP Technical Specification 44.018, version 8.15.0, Section 3.2.3.3, entitled "Provision Of Individual Priorities Information", states:

"A mobile station shall store individual priorities if received in the Individual Priorities IE in the CHANNEL RELEASE message. If the T3230 timeout value is provided the mobile station shall set timer T3230 to the value received and start timer T3230 (or restart timer T3230 with the timeout value provided if already running)."

Option 1—According to the implementation of Option 1, the UE 121 may ignore the new priorities and proceed as before, possibly using previous dedicated priorities. The implementation of Option 1 may vary depending on the specific RAT. In a first system, for example a GSM system, the UE may act on the received Channel Release message, but ignore the priorities in the IE. However, in a second system, for example a UMTS system, the UE may further reject the UMI message. Thus, Option 1 may have a plurality of subcases, including ignore the priority information, and either accept or reject the message. By way of example, a UE may implement Option 1 by operating in accordance with the above portion of Section 3.2.3.3, amended to further include:

"If the Individual Priorities IE contains priorities for more than 16 UTRAN FDD frequencies, more than 16 UTRAN TDD frequencies, or more than 8 E-UTRAN frequencies, then the mobile station may ignore the contents of the Individual Priorities IE."

Option 2—According to the implementation of Option 2, the UE 121 may delete all dedicated priorities and may use common priorities, such as broadcast or non-user equipment specific priorities. Alternatively, UE 121 may use a legacy algorithm instead of common priority information to perform reselection. By way of example, a UE may implement Option 2 by operating in accordance with the above portion of Section 3.2.3.3 of 3GPP Technical Specification 44.018, amended to further include:

"If the Individual Priorities IE contains priorities for more than 16 UTRAN FDD frequencies, more than 16 UTRAN TDD frequencies, or more than 8 E-UTRAN frequencies, then the mobile station may ignore the contents of the Individual Priorities IE and, in this case, shall delete any stored individual priorities."

Option 4—According to the implementation of Option 4, the UE 121 may store and act on priorities up to the agreed limit and may discard the remaining priorities. By way of example, a UE may implement Option 4 by operating in accordance with the above portion of Section 3.2.3.3 of 3GPP Technical Specification 44.018, amended to further include:

"If the Individual Priorities IE contains priorities for more than 16 UTRAN FDD frequencies, more than 16 UTRAN TDD frequencies, or more than 8 E-UTRAN frequencies, then the mobile station may ignore the indicated priorities for any frequencies in excess of these limits. The mobile station shall store E-UTRAN (respectively UTRAN) priority information with the following priority (highest first): frequencies listed in Repeated Individual E-UTRAN Priority Parameters Description structs (respectively Repeated Individual UTRAN Priority Parameters struct) in order of being signalled, frequencies to which the DEFAULT_E-UTRAN_PRIORITY (respectively DEFAULT_UTRAN_PRIORITY) applies, in order of their listing in the E-UTRAN Neighbour Cell list (respectively 3G Frequency list)."

By way of example, a UE also may implement Option 4 by operating in accordance with Section 8.6.7.23 of 3GPP Technical Specification 25.331 further amended to include (changes are underlined):

"The UE shall:
1> store IE "Dedicated Priority Information";
If the CHOICE "Action" has the value "Clear dedicated priorities", the UE shall:
. . .
If the CHOICE "Action" has the value "Configure dedicated priorities", the UE shall:
1> clear the variable PRIORITY_INFO_LIST;
1> stop timer T322, if it is running;
1> set the value of IE "Priority status" in the variable PRIORITY_INFO_LIST to "dedicated_priority";
1> for each occurrence of the IE "Priority Level List" containing UTRAN or E-UTRAN frequencies, and for each of at least the first 3 occurrences of the IE "Priority Level List" containing GSM frequencies:
2> create a new entry in the IE "Priority Info List" in the variable PRIORITY_INFO_LIST, and in that new entry:
3> set the CHOICE "Radio Access Technology" to the value received in the IE "Priority Level List";
3> set the IE "priority" to the value received in the IE "Priority Level List";
3> set the values in IE "Frequency List" or "BCCH ARFCN" to the values received in the IE "Priority Level List" up to at least the following overall limits: 16 UARFCNs corresponding to UTRAN_FDD frequencies; 16 UARFCNs corresponding to UTRAN_TDD frequencies; 8 EARFCNs.
NOTE: The limits apply across all instances of "Priority Level List" IEs. The limits for UTRAN_FDD, UTRAN_TDD and EARFCNs apply independently of each other.

Section 3.2.3.3 of 3GPP Technical Specification 44.018 further states:

"At inter-RAT cell reselection from UTRAN or E-UTRAN to GERAN or cell selection that results in a change of RAT from UTRAN or E-UTRAN to GERAN, the MS shall inherit individual priority information if the corresponding timer (T320 if the last serving RAT was E-UTRA; T322 if the last serving RAT was UTRA) has not expired. In this case the mobile station shall start timer T3230 with the timeout value set to the remaining validity time of the corresponding timer from the source RAT.

"If this inherited individual priority information includes more than one individual priority for GERAN frequencies, then the mobile station shall apply only the one applicable to the BCCH carrier of the GERAN cell that was (re)selected as the individual priority for all GERAN cells, for as long as the mobile station remains in GERAN. In this case the mobile station shall not apply the other GERAN individual priority(ies) until the MS leaves GERAN (see 3GPP TS 25.331, 3GPP TS 36.331)."

Option 3—According to the implementation of Option 3, the UE 121 may initially (i.e., on receipt of the priorities), store and act on the new priorities (above the limit, up to and including all signaled priorities). Option 3 may be complemented by one of a number of behaviours when moving to a cell of a different RAT. For example, a UE may implement such additional behaviours by operating in accordance with the above portion of Section 3.2.3.3 of 3GPP Technical Specification 44.018 amended to further include:

"If the inherited individual priority information includes priority information for more than 16 UTRAN FDD frequencies, more than 16 UTRAN TDD frequencies, or more than 8 E-UTRAN frequencies, then the mobile station shall delete all individual priority information."

Alternatively, a UE may implement such additional behaviours by operating in accordance with the above portion of Section 3.2.3.3 of 3GPP Technical Specification 44.018 amended to further include:

"If the inherited individual priority information includes priority information for more than 16 UTRAN FDD frequencies, more than 16 UTRAN TDD frequencies, or more than 8 E-UTRAN frequencies, then the mobile station may delete the indicated priorities for any frequencies in excess of these limits."

Thus, if Option 3 is selected, then when UE 121 moves to a new RAT, any of Options 1, 2, and 4 may be performed at the change of RAT.

Thus, for Options 1 and 2, the UE may ignore and/or delete the newly received priority information. For Option 4, the UE may store the newly received priority information up to the limit. For option 3, there are various possibilities. In one case, upon receipt of priority information, and before a RAT change, the UE may store some of the newly received priority information (above the limit). Subsequently, after a RAT change, the UE may: 1) delete and/or ignore the information (Option 3+Option 1 or Option 2); 2) store the priority information amount up to and including the limit (Option 3+Option 4); 3) store and/or use a different amount of priority information (above the limit) (Option 3+Option 3); and 4) store an amount of priority information that is greater than 0 and fewer than the limit.

The frequencies may be counted regardless of whether or not a UE supports them. Capabilities signaled in one RAT may not indicate UE support of individual frequency bands for another RAT. It may be difficult for the radio access network to restrict signaling of dedicated priorities to those frequencies that the UE supports. Therefore, in one advantageous example, an enhancement to the limits such as those defined in the Table in FIG. 5 may consider only frequencies that the UE does support. For example, UE 121 may store up to 8 EARFCNs that UE 121 supports. Provided that the dedicated priority information includes 8 or fewer EARFCNs that the UE supports, then the limit is not exceeded, independently of the number of unsupported EARFCNs for which dedicated priority information is signaled.

The present disclosure describes apparatuses and methods for processing priority information that exceed the limits on the amount of priority information the UE handles. These limits may be coordinated across different RATs, to thereby define UE behaviour when inheriting priorities during a change from one RAT to another. The PRIORITY_INFO_LIST variable may be updated to satisfy the requirements. Similarly, for GSM signaling, minimum limits may also be placed on the number of UTRAN and E-UTRAN dedicated priorities which the UE is required to be able to handle.

While the tables shown in FIGS. 4 and 5 illustrate defined limit values, it is understood that the limits are by way of example only, and that other defined limits may be used without parting from the teachings of the present disclosure.

Although the present disclosure has been described with selected examples, various changes and modifications may be suggested to one skilled in the art. It is intended that the present disclosure encompass such changes and modifications as fall within the scope of the appended claims.

What is claimed is:

1. A method in a user equipment configured to perform reselection between cells according to a priority-based reselection (PBR) algorithm using priority information, the method comprising:
   receiving an incoming message including priority information;
   determining if the received priority information comprises priority information for at least one of:
      i) more than a first number of UTRAN FDD frequencies,
      ii) more than a second number of UTRAN TDD frequencies, or
      iii) more than a third number of E-UTRAN frequencies; and
   in response to a determination that the received priority information comprises priority information for more than the first number of UTRAN FDD frequencies, or more than the second number of UTRAN TDD frequencies, or more than the third number of E-UTRAN frequencies, performing cell reselection without regard to the received priority information.

2. The method as set forth in claim 1, wherein the first number is 16, the second number is 16, and the third number is 8.

3. The method as set forth in claim 1, further comprising:
   in response to a determination that the received priority information comprises priority information for more than the first number of UTRAN FDD frequencies, or more than the second number of UTRAN TDD frequencies, or more than the third number of E-UTRAN frequencies, deleting dedicated priority information and performing cell reselection using common priority information.

4. The method as set forth in claim 1, further comprising:
   in response to a determination that the received priority information comprises priority information for more than the first number of UTRAN FDD frequencies, or more than the second number of UTRAN TDD frequencies, or more than the third number of E-UTRAN frequencies, deleting stored dedicated priority information, and performing cell reselection using common priority information.

5. The method as set forth in claim 1, further comprising:
   in response to a determination that the received priority information comprises priority information for more than the first number of UTRAN FDD frequencies, or more than the second number of UTRAN TDD frequencies, or more than the third number of E-UTRAN frequencies, storing and using the received priority information up to at least the defined limits, and without regard to at least one of the received priority information exceeding the defined limits.

6. The method as set forth in claim 1, further comprising:
   in response to a determination that the received priority information comprises priority information for more than the first number of UTRAN FDD frequencies, or more than the second number of UTRAN TDD frequencies, or more than the third number of E-UTRAN frequencies, storing and using the received priority information; and
   in response to a subsequent determination that the user equipment has selected or reselected from a first cell having a first radio access technology to a second cell having a second radio access technology, one of:
      i) deleting the stored received priority information; or
      ii) deleting priority information for any frequencies in excess of these limits.

7. A user equipment comprising:
   a controller configured to perform reselection between cells according to a priority-based reselection (PBR) algorithm using priority information;
   transceiver circuitry configured to operate in cells using at least one radio access technology and to receive incoming messages including the priority information; and
   a memory configured to store the received priority information,
   wherein the controller is further configured to determine if the received priority information comprises priority information for at least one of:
      i) more than a first number of UTRAN FDD frequencies,
      ii) more than a second number of UTRAN TDD frequencies, or
      iii) more than a third number of E-UTRAN frequencies; and
   wherein the controller is further configured, in response to a determination that the received priority information comprises priority information for more than the first number of UTRAN FDD frequencies, or more than the second number of UTRAN TDD frequencies, or more than the third number of E-UTRAN frequencies, to perform cell reselection without regard to the received priority information.

8. The user equipment as set forth in claim 7, wherein the first number is 16, the second number is 16, and the third number is 8.

9. The user equipment as set forth in claim 7, wherein the controller is further configured, in response to a determination that the received priority information comprises priority information for more than the first number of UTRAN FDD frequencies, or more than the second number of UTRAN TDD frequencies, or more than the third number of E-UTRAN frequencies:
   to delete all dedicated priority information; and
   to perform cell reselection using common priority information.

10. The user equipment as set forth in claim 7, wherein the controller is further configured, in response to a determination that the received priority information comprises priority information for more than the first number of UTRAN FDD frequencies, or more than the second number of UTRAN TDD frequencies, or more than the third number of E-UTRAN frequencies:

to delete stored dedicated priority information; and to perform cell reselection using common priority information.

11. The user equipment as set forth in claim 7, wherein the controller is further configured, in response to a determination that the received priority information comprises priority information for more than the first number of UTRAN FDD frequencies, or more than the second number of UTRAN TDD frequencies, or more than the third number of E-UTRAN frequencies:

to store and to use the received priority information up to the defined limits and without regard to at least one of the received priority information exceeding the defined limits.

12. The user equipment as set forth in claim 7, wherein the controller is further configured:

in response to a determination that the received priority information comprises priority information for more than the first number of UTRAN FDD frequencies, or more than the second number of UTRAN TDD frequencies, or more than the third number of E-UTRAN frequencies, to store and to use the received priority information; and in response to a subsequent determination that the user equipment has selected or reselected from a first cell having a first radio access technology to a second cell having a second radio access technology, one of:

i) to delete the stored received priority information; or ii) to delete priority information for any frequencies in excess of these limits.

13. A method in a user equipment configured to perform reselection between cells according to a priority-based reselection (PBR) algorithm using priority information, the method comprising:

in response to receiving an incoming message including information for more than a first number of UTRAN FDD frequencies, or more than a second number of UTRAN TDD frequencies, or more than a third number of E-UTRAN frequencies, performing cell reselection without regard to the received priority information.

14. The method as set forth in claim 13, wherein the first number is 16, the second number is 16, and the third number is 8.

15. The method as set forth in claim 13, further comprising:

in response to receiving an incoming message including information for more than the first number of UTRAN FDD frequencies, or more than the second number of UTRAN TDD frequencies, or more than the third number of E-UTRAN frequencies, deleting dedicated priority information and performing cell reselection using common priority information.

16. The method as set forth in claim 13, further comprising:

in response to receiving an incoming message including information for more than the first number of UTRAN FDD frequencies, or more than the second number of UTRAN TDD frequencies, or more than the third number of E-UTRAN frequencies, deleting stored dedicated priority information, and performing cell reselection using common priority information.

17. The method as set forth in claim 13, further comprising:

in response to receiving an incoming message including information for more than the first number of UTRAN FDD frequencies, or more than the second number of UTRAN TDD frequencies, or more than the third number of E-UTRAN frequencies, storing and using the received priority information up to at least the defined limits, and without regard to at least one of the received priority information exceeding the defined limits.

18. The method as set forth in claim 13, further comprising:

in response to receiving an incoming message including information for more than the first number of UTRAN FDD frequencies, or more than the second number of UTRAN TDD frequencies, or more than the third number of E-UTRAN frequencies, storing and using the received priority information; and in response to a subsequent determination that the user equipment has selected or reselected from a first cell having a first radio access technology to a second cell having a second radio access technology, one of:

i) deleting the stored received priority information; or ii) deleting priority information for any frequencies in excess of these limits.

* * * * *